Jan. 23, 1968  F. M. BROWN ET AL  3,364,518
PROCESS FOR DEBONING MEAT
Filed Jan. 5, 1967  7 Sheets-Sheet 1

INVENTORS
JESSE A. WILLCOX,
FRANK M. BROWN,
JEAN A. BURTON,
GERALD L. HELGESON

Williamson, Palmatier
BY & Bains ATTORNEYS

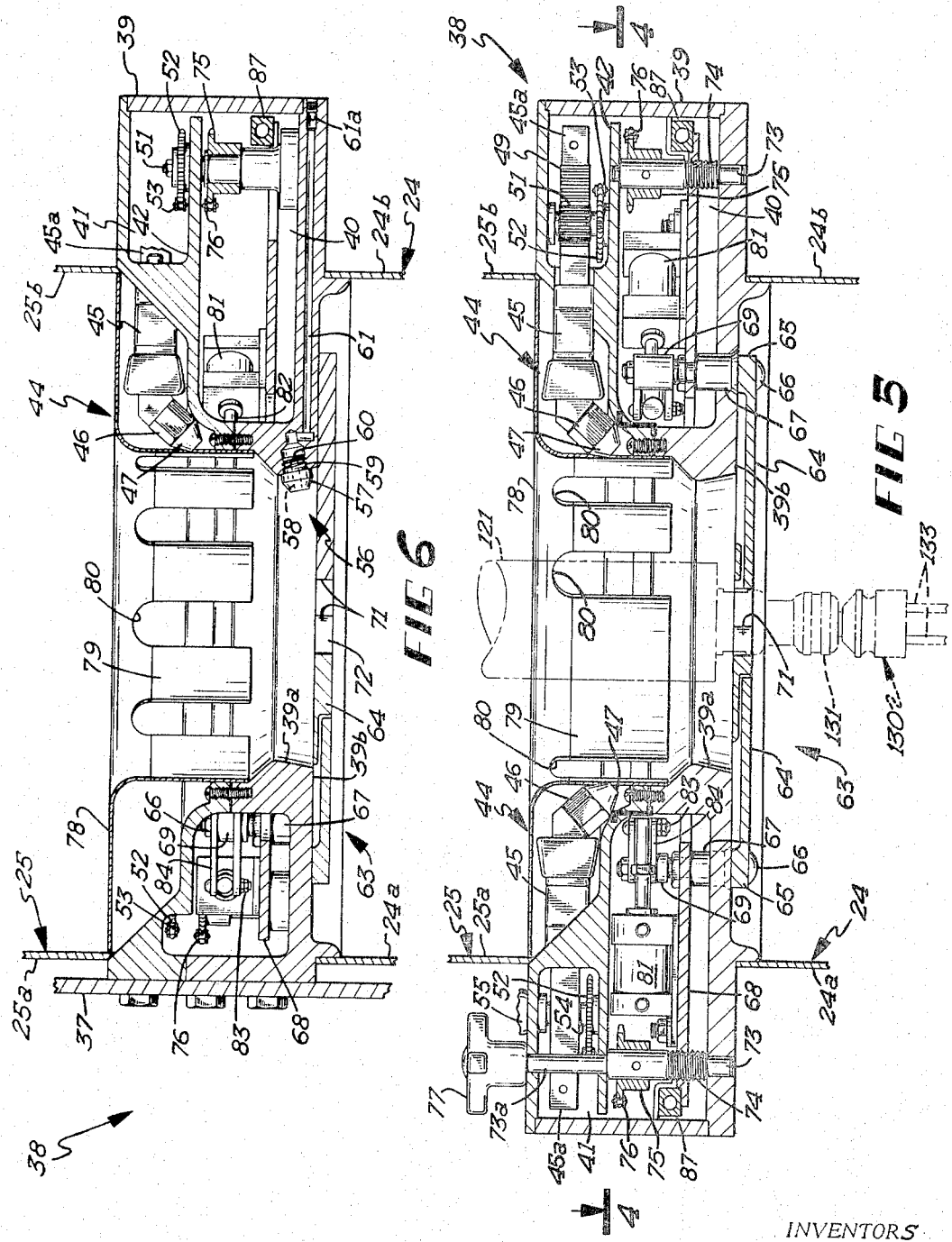

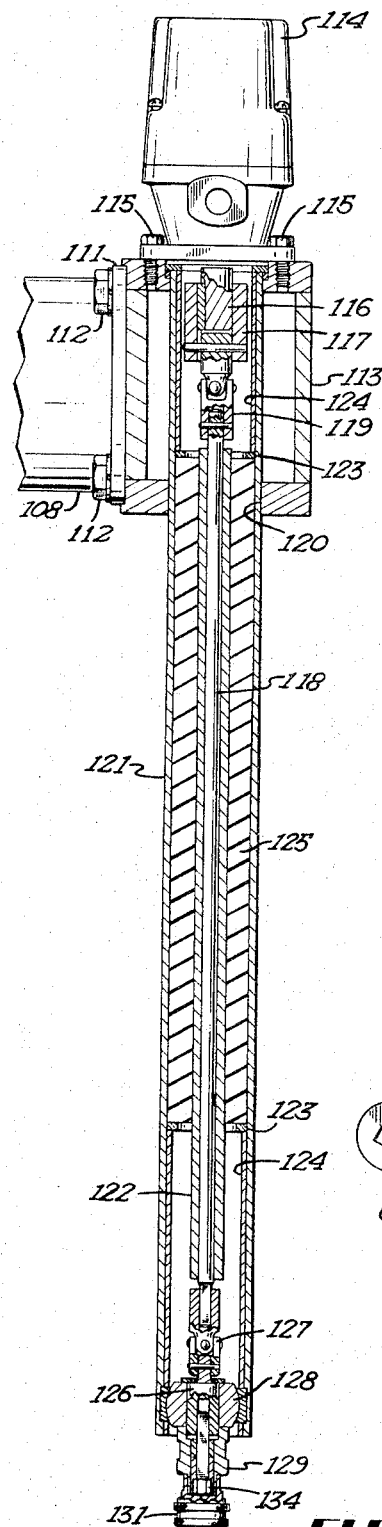

Jan. 23, 1968  F. M. BROWN ET AL  3,364,518
PROCESS FOR DEBONING MEAT

Filed Jan. 5, 1967  7 Sheets-Sheet 7

INVENTORS
JESSE A. WILLCOX,
FRANK M. BROWN,
JEAN A. BURTON,
GERALD L. HELGESON
BY Williamson, Palmatier
& Bains  ATTORNEYS 3,364,518
PROCESS FOR DEBONING MEAT
Frank M. Brown, Jean A. Burton, and Gerald L. Helgeson, Austin, and Jesse A. Willcox, Excelsior, Minn., assignors to Geo. A. Hormel & Company, Austin, Minn., a corporation of Delaware
Continuation-in-part of application Ser. No. 493,362, Oct. 6, 1965. This application Jan. 5, 1967, Ser. No. 607,572
9 Claims. (Cl. 17—45)

ABSTRACT OF THE DISCLOSURE

A process and apparatus for removing a bone or core member from embedded relation within a chunk of meat or other material wherein the chunk of meat is positioned against a barrier having an adjustable opening therein through which the bone or core member projects. Forcing the bone or core member through the opening in the barrier and revolving the chunk of meat and bone while subjecting the periphery of the bone to the action of high velocity jets or water to cause progressive separation of the bone from the chunk of meat while maintaining the chunk of meat and bone in substantially intact condition.

This invention relates to a process and apparatus for removing bone from a cut or chunk of meat and more specifically to a continuous process and apparatus utilizing fluid pressure for separating bone from a chunk of meat. This is a continuation-in-part application of copending application Ser. No. 493,362, filed Oct. 6, 1965 and now abandoned.

In the meat packing industry, it is quite often desirable to remove bone from a chunk or cut of meat prior to further processing of the meat. While many mechanical systems have been developed for removing a bone from its embedded relation within a chunk of meat, these prior art systems do not permit the bone to be removed while the chunk of meat remains substantially intact, and some of the meat adheres to the bone which is being removed. In a relatively large deboning operation with conventional systems, even the small amount of meat which normally adheres to the bone will amount to a relatively large quantity and this condition necessitates a further removal operation as by brushing and the like.

It is therefore a general object of this invention to provide a high capacity process and apparatus for removing bone from a chunk of meat preferably in an uncooked raw condition through the action of fluid pressure so that substantially all of the meat separated from the bone may be recovered.

A more specific object of this invention is to provide a novel process and apparatus for removing embedded bone from a chunk of raw meat by moving the chunk of meat against a barrier having an opening therein through which the bone is urged while subjecting the entire periphery of the bone to high velocity jets of flowable material, preferably water under pressure, so that the bone is removed while the chunk of meat remains substantially intact.

A further object of this invention is to provide an apparatus and method wherein a plurality of chunks of meat are simultaneously treated with fluid pressure to very effectively remove the bone from embedded relation therein.

These and other objects and advantages of this invention will more fully appear from the following description made in connection with the accompanying drawings wherein like reference characters refer to the same or similar parts throughout the several views, and in which:

FIG. 5 is a cross-sectional view taken approximately along line 5—5 of FIG. 3 and looking in the direction of the arrows;

FIG. 6 is a cross-sectional view taken approximately along line 6—6 of FIG. 3 and looking in the direction of the arrows;

FIG. 7 is a detail vertical sectional view of a spindle assembly for one of the bone separating units;

FIG. 9 is a plan view of one of the barrier or iris segments;

FIG. 10 is a side elevational view of the spindle assembly and magnetic transfer arm just prior to uncoupling of the bone pinning mechanism from the spindle assembly.

In practicing the present process, an embedded bone in a chunk of meat is removed from the chunk of meat by the blasting action produced by a plurality of jets of flowable material, preferably water, so that the muscle tissue which adheres to the bone will be separated therefrom. By treating a chunk of meat to the blasting action of an inexpensive fluid such as water, which also produces no undesirable changes in the meat, the bone may be separated from embedded relation within the chunk of meat while minimizing the occurrence of splinters or bits of bones and shreds or small discrete particles of meat.

In the present process and apparatus, the chunk of meat with the bone embedded therein is positioned against a barrier or iris assembly, which has an opening therein through which the embedded bone may project. The periphery of the bone is engaged by the barrier assembly and the chunk of meat is urged against the distal surface of the barrier assembly while subjecting the bone to a plurality of high velocity jets of water. The water is discharged against the bone adjacent the proximal surface of the barrier assembly, while the meat is held against the distal surface of the barrier assembly. Thus, a rectilinear force exerted against the chunk of meat, either pulling or pushing, while simultaneously subjecting the bone to the action of the high velocity jets of water, tends to peel the flesh from the bone while the bone is progressively moved away from the barrier assembly while the chunk of meat is retained against the distal surface of the barrier assembly. By using the high velocity jets of flowable material to separate the bone and meat, chunks of meat which have bones embedded therein may be very effectively and quickly deboned without shredding, tearing or otherwise altering the original shape and size of the chunk of meat.

In the present process and apparatus, a plurality of deboning units are provided, each of which is simultaneously operated so that a plurality of chunks of meat may be simultaneously deboned. The barrier or iris assemblies not only serves as a means to retain the chunk of meat thereagainst during the deboning operation, but these barrier assemblies also shield the associated chunk of meat against the action of the jets of water, so that the meat is not perfused with the water.

Figure 1:
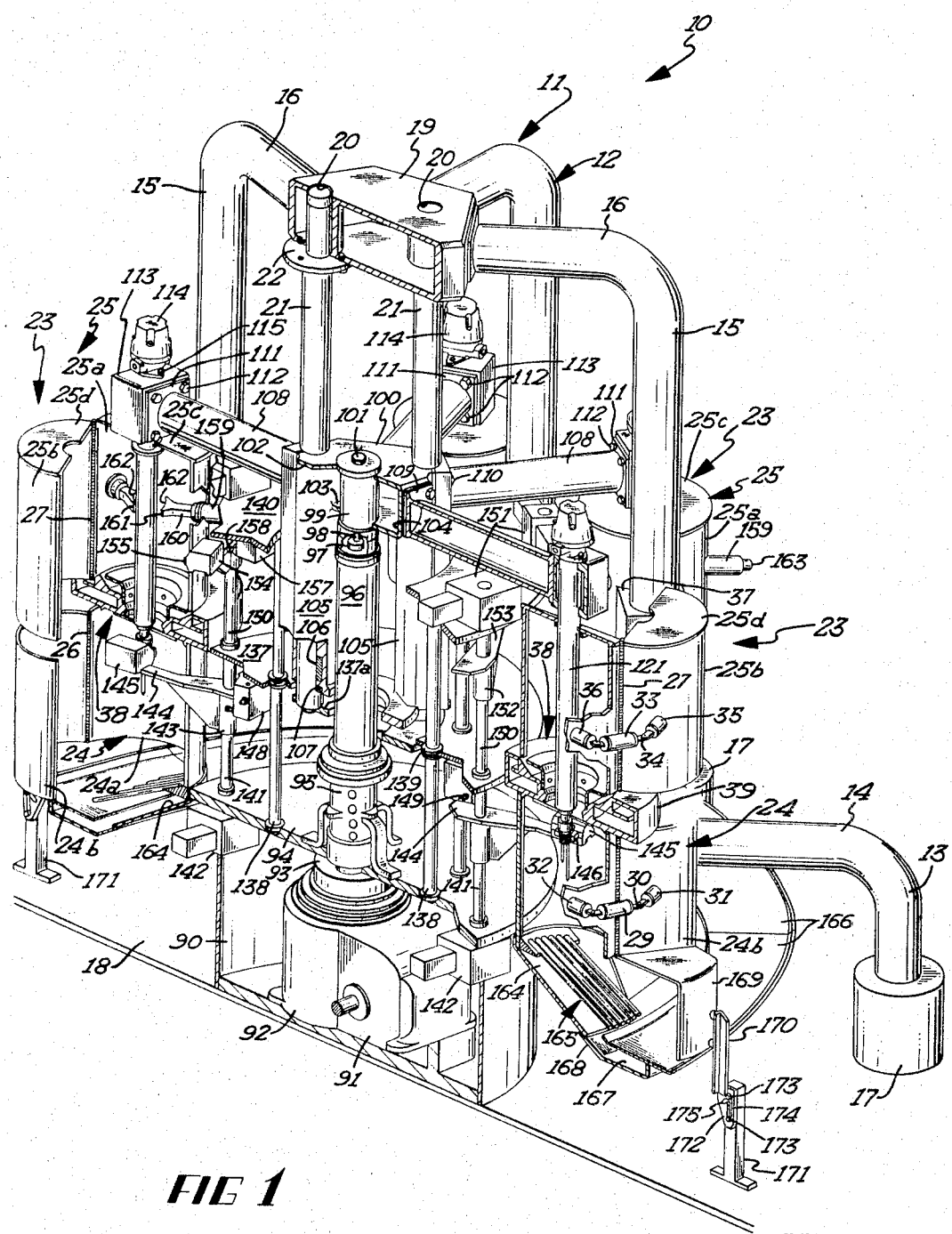
FIG. 1 is a perspective view of a portion of the entire apparatus with significant portions thereof broken away thereby illustrating a number of the various components thereof.
Figure 2:
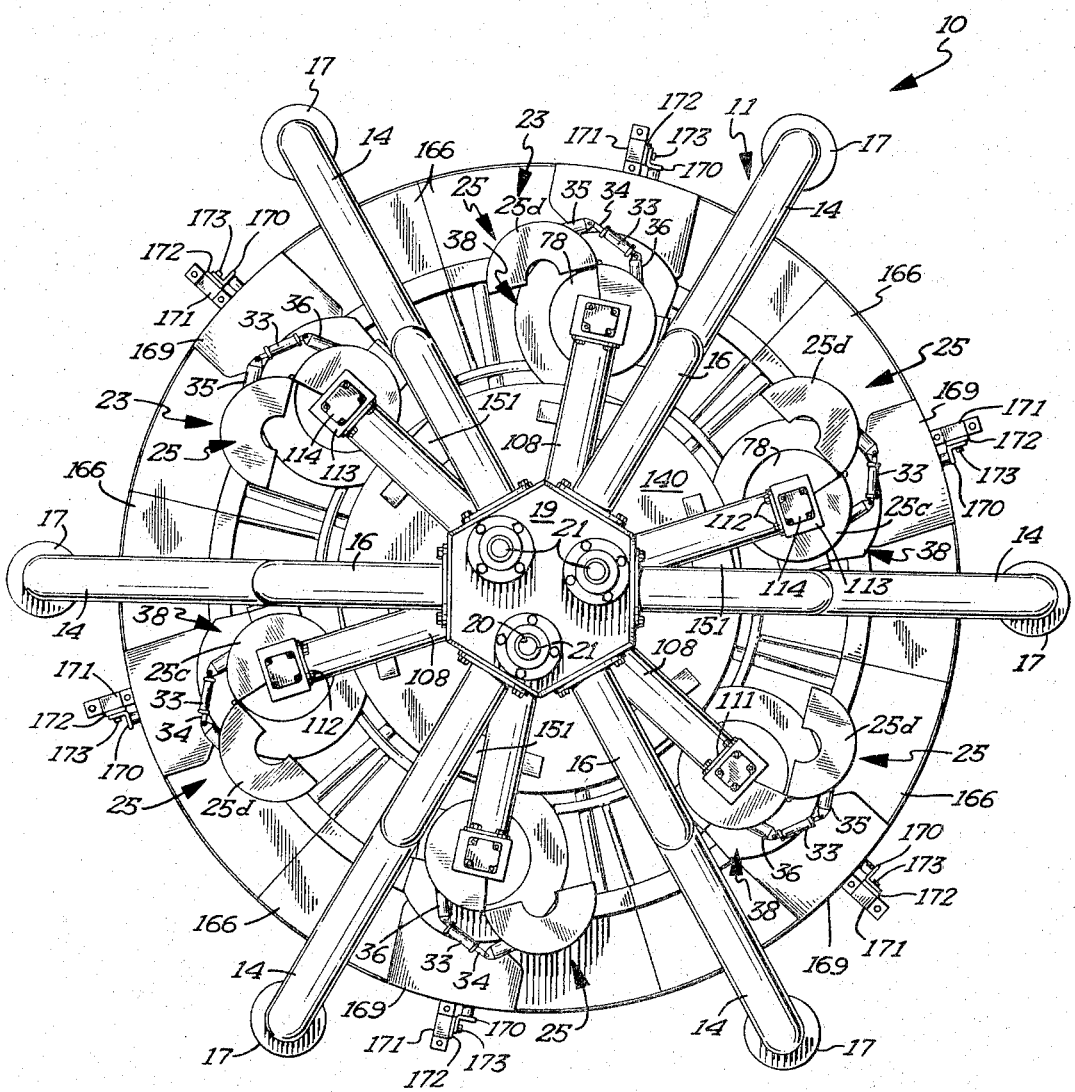
FIG. 2 is a top plan view of the apparatus.

Referring now to the drawings, and more specifically to FIGS. 1 and 2, it will be seen that one embodiment of the novel deboning apparatus for practicing the novel method, and designated generally by the reference numeral 10, is there shown. In the embodiment shown, a plurality of deboning units are incorporated in the single apparatus and these deboning units are arranged in a generally circular fashion. These deboning units are simultaneously operated so that a plurality of chunks of meat may be deboned simultaneously.

The apparatus 10 includes a support structure 11 which includes a plurality of similar support members 12 each including a lower vertical portion 13, a lower horizontal portion 14, an upper vertical portion 15, and an upper horizontal portion 16. The lower vertical portion 13 is connected to an anchoring member 17 which may be attached to any conventional support surface such as a floor 18 or the like. It will be noted that the vertical portions of each support member, as well as the horizontal portions thereof are disposed in parallel relation with respect to each other.

The upper end of the support member 12 is rigidly affixed to one of the side surfaces of a hexagonally shaped assembly housing 19 which is comprised of spaced apart upper and lower plates which are integrally connected together by side plates. The upper and lower plates of the bearing housing 19 have registering pairs of openings therein which receive the upper ends of a plurality of elongate guide rods 21 therein. Guide rods 21 are disposed in parallel relation with respect to each other and each is provided with attachment collar 22 which is suitably apertured and which is bolted or otherwise rigidly secured to the assembly housing 19. Thus, the guide rods 21 are rigidly affixed to the assembly housing 19 and depend therefrom, and each has its lower end terminating at a point spaced substantially above the floor 18. Referring now to FIG. 2, it will be seen that the support structure includes three guide rods 21 and six support members 12.

Referring again to FIGS. 1 and 2, it will be seen that the deboning apparatus 10 includes a plurality of deboning units 23, six such units being shown and arranged in a circular pattern. Each of these deboning units comprises a lower cabinet or chamber structure 24 and an upper cabinet or chamber structure 25. These cabinet structures are of substantially cylindrical configuration and are formed of a suitable rigid material.

Each lower cabinet includes a fixed generally semi-cylindrical section 24a and a movable generally semi-cylindrical section 24b which is hingedly connected to the fixed section 24a by a hinge 26. Similarly, each upper cabinet comprises a fixed semi-cylindrically shaped section 25a and a semi-cylindrical movable section 25b hingedly connected to the fixed section by hinge 27. The fixed section 25a of the upper cabinet has a semi-circular upper end wall 25c rigidly affixed thereto, while the movable section 25b also has a semi-circular upper end wall 25d affixed thereto. The respective movable sections of the upper and lower cabinets actually constitute a closure or door which is swingable between open and closed positions to permit ready access to the interior of the cabinets. It will be noted that when the upper cabinet is in the closed condition, the respective end walls thereof will be disposed in abutting relation and substantially close the upper end thereof. The lower end of the upper cabinet is open while both ends of the lower cabinet are open.

Means are also provided for swinging the movable sections of each upper and lower cabinet between open and closed conditions. To this end, each lower cabinet is provided with a double acting pneumatic cylinder 29 having a piston movable therein to which is connected a piston rod 30, which projects exteriorly from one end of the cylinder 29. This piston rod 29 is pivotally connected to an attachment bracket 31 which is affixed to the swingable section of the lower cabinet while the opposite end of the cylinder 29 is pivotally connected to a bracket 32, which is fixedly secured to the associated fixed section 24a.

Similarly, the upper cabinet is provided with a cylinder 33 having a piston movable therein to which is connected a piston rod 34. The outer end of the piston rod 34 is pivotally connected to a bracket 35 which is affixed to the movable section 25b, while the opposite end of the cylinder 33 is pivotally connected to a bracket 36, which is affixed to the associated fixed section 25a. All of these double acting pneumatic piston and cylinder units are connected to a source of pneumatic pressure and the valving controls provided therefor will permit all of the doors of the lower cabinets to be opened and closed simultaneously, and all of the upper cabinets to be opened and closed simultaneously.

Each pair of upper and lower cabinets is rigidly interconnected together by housing 39 of a stripping or separating device, so that the adjacent ends of the upper and lower cabinets are spaced apart from each other. Each housing 39 is provided with a bracket clamp 37 which engages and is clamped around the adjacent support member 12. The housing 39 for each upper and lower pair of cabinets is actually secured to the fixed section of each cabinet, and is clamped around the upper vertical portion 15 of the associated support member 12.

Each pair of upper and lower cabinets has a stripping or separating device and an iris assembly interposed therebetween which cooperate with each other for separating the bone from the meat. The stripping or separating device is designated generally by the reference numeral 38 as best seen in FIGS. 5 and 6, and comprises a housing 39 preferably formed of cast metal and being of annular configuration. The housing 39 has a hollow interior separated into a lower compartment 40 and an upper compartment 41, these compartments being separated by an annular divider wall 42, as best seen in FIGS. 5 and 6.

Figure 3:
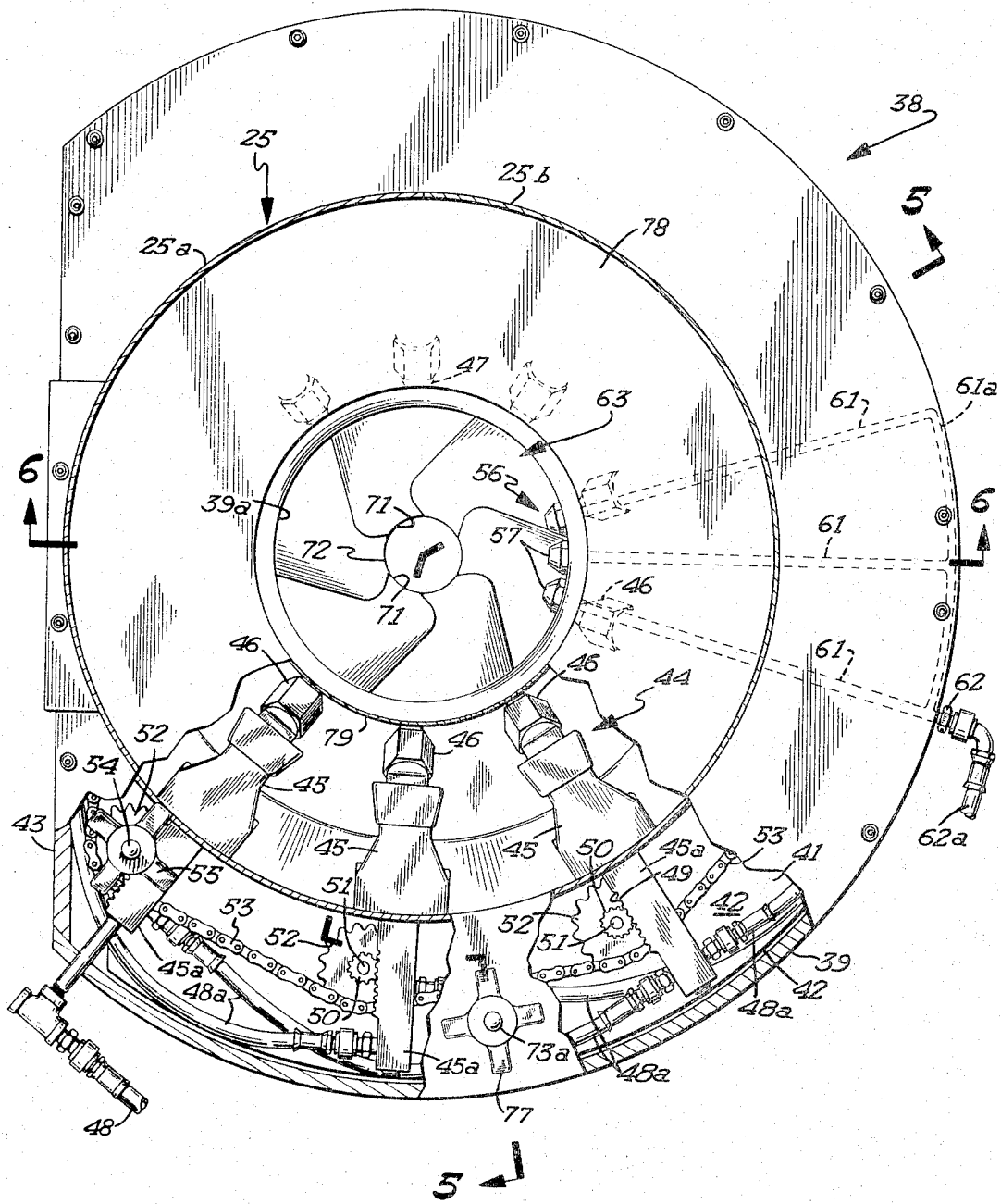
FIG. 3 is a plan view looking downwardly through one of the bone separating units with certain parts thereof broken away for clarity.
Figure 4:
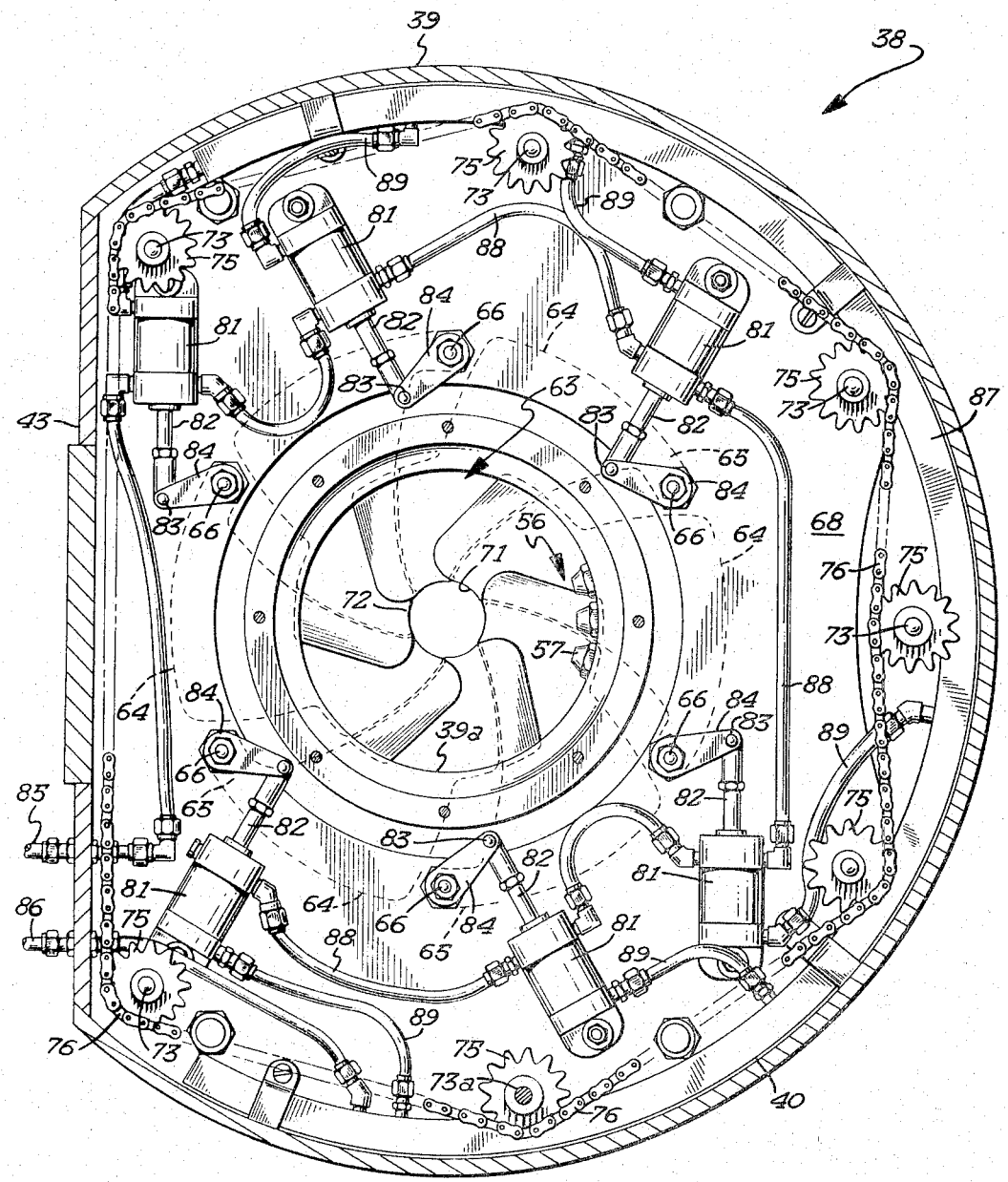
FIG. 4 is a cross-sectional view taken approximately along line 4—4 of FIG. 5 and looking in the direction of the arrows.

Referring now to FIGS. 3 and 4, it will be seen that the housing 29 has a generally circular periphery throughout the major portion of its perimeter but has one surface 43 thereof which is of substantially flat straight configuration. This flat surface 43 is secured by bolts or the like to the associated bracket 37, so that the housing is also rigidly mounted on one of the support members 12.

A plurality of jet mechanisms are provided, each being mounted on the housing 39 and each including a body portion 45 having a discharge nozzle 46 at one end thereof. The discharge nozzle 46 has a relatively small discharge orifice 47 therein as best seen in FIGS. 5 and 6, through which a high pressure jet of water is discharged. It will be noted, that the discharge nozzle 47 is disposed in angulated relation with respect to the body portion 45. In the embodiment shown, each deboning unit 23 is generally vertically oriented, and the housing 39 thereof is normally horizontally oriented. The opening 39a in the annular housing 39 also faces vertically and the discharge nozzles 46 are therefore disposed in downwardly angulated relation with respect to this opening. It will be noted, that the jet mechanisms 44 are arranged in circular fashion so that a plurality of jets of water will be discharged in downwardly angulated relation throughout a circular arc of 360°.

Referring again to FIGS. 3, 5 and 6, it will be seen that the rear end portion 45a of the body portion 45 is positioned within the upper compartment 41 and is provided with a plurality of teeth at one side thereof which teeth define a gear rack 49. The gear rack 49 is engaged by small pinion 50 which is mounted on a pin or axle 51 which in turn is journalled in the divider wall 42 of the associated housing 39. Each pin or axle 51 has a larger sprocket 52 keyed or otherwise secured thereto for rotation therewith. Thus, rotation of the sprocket 52 produces rotation of the associated pinion 50, which in turn causes rectilinear movement of the gear rack 49. It will therefore be seen that by revolving the sprocket 52, the jet mechanisms may be moved radially inwardly and outwardly with respect to the axial center of the housing 39, and the opening 39a therein.

Means are provided for revolving the sprocket 52, and this means includes an endless sprocket-engaging chain 53, which is trained about all of the sprockets 52 in each housing 39 as best seen in FIGS. 3 and 6. An elongate actuating shaft 54 projects downwardly into the housing 39 and is journalled therein, and this shaft also has a sprocket thereon which engages the chain 53. The upper or exterior end of the shaft 54 projects above or exteriorly of the housing 39 and is provided with a turning handle 55 to facilitate revolving movement of the shaft 54. It will be seen that revolving movement of the shaft 54 in one direction serves to shift the jet mechanisms 44 radially outwardly and revolving movement in the other direction shifts the jet mechanisms radially inwardly.

A main water supply conduit 48 is interconnected to one of the jet mechanisms 44 and is also connected to a source of water under pressure, such as a pump, so that water under pressure will be supplied to the various jet mechanisms 44. To this end, it will be noted that while only one of the jet mechanisms 44 is connected in communicating relation to the main supply conduit 48, these various jet mechanisms are intercommunicated with each other by interconnecting conduits 48a so that all of the jet mechanisms will be interconnected to a source of water under pressure.

Each separating device 38 also includes a second group of jet mechanisms 56, each including a discharge nozzle fitting 57, which is provided with a relatively small discharge orifice 58, through which the high velocity jet of water is discharged. The nozzle 57 is exteriorly threaded as at 59 and fits within a threaded recess 60 formed in the inner annular surface of the housing 39 as best seen in FIG. 6. It will be noted that the jet mechanisms 56 are positioned below the jet mechanisms 44 and are disposed in slight angulated relation with respect to the horizontal to discharge high velocity jets of water in a downwardly inclined angle.

Each threaded recess in which the associated jet mechanism 56 is disposed is connected in communicating relation to one of a plurality of passages 61 which are formed in the lower annular wall 39a of the housing 39. These passages 61 extend generally radially outwardly from the recesses 60 and are interconnected at their outermost ends by a transverse passage 61a. A supply conduit 62a provided with a fitting 62 is interconnected in communicating relation with the passage 61a and supplies the jet mechanisms 56 with water under pressure. It will be noted that the jet mechanisms 56 are fixed relative to the opening 39a and the housing 39. In the embodiments shown, only three such secondary jet mechanisms 56 are provided and these jet mechanisms are disposed in close proximity to each other and cooperate with the jet mechanisms 44 for effectively removing the meat from the bone during the deboning operation especially with regard to larger chunks of meat.

The barrier or iris assembly 63 for each deboning unit is interposed between the respective upper and lower cabinets of the associated deboning unit, and each barrier assembly is comprised of a plurality of similar barrier segments 64, which are disposed in overlapping relation with respect to each other. Each barrier segment 64 is constructed of a rigid metallic material and is of substantially flat configuration having an attachment arm 65 integrally formed therewith, and projecting laterally from one longitudinal edge thereof as best seen in FIG. 9. The attachment arm is apertured as at 65a, and is pivotally mounted to the lower wall 39b of the housing 39 by pivot pin 66. The pivot pin 66 projects upwardly into the lower compartment 40 of the housing 39 and a sleeve bearing or bushing 67 journals the pin for rotation about its longitudinal axis.

An annular member or plate 68 is positioned within the lower compartment 40 of the housing 39 and is also provided with a plurality of apertures through which the axles or pivot pins 66 project, as best seen in FIG. 5. This annular plate 68 is spaced above the upper surface of the lower wall 39b of the housing 39, and each pivot pin 66 is provided with a spacer sleeve 69 thereon to position the annular member 68 in the compartment 40.

Referring again to FIG. 9, it will be seen that each segment 64 has a recessed marginal portion 70 therein adjacent one edge thereof so that when the segments are disposed in overlapping relation, the marginal recessed portions of adjacent segments mate and the segments present a coplanar upper or proximal surface and a coplanar or lower distal surface. It will also be noted that an inner edge portion 71 of each segment is arcuate and cooperates with the arcuate surfaces of the other segments of each barrier assembly to define a generally circular opening 72, as best seen in FIG. 4. These arcuate inner edge surfaces 71 which define the opening 72, are adapted to engage the bone of a chunk of meat which is to be removed therefrom in a manner to be described hereinbelow.

Referring again to FIGS. 4, 5 and 6, it will be seen that the annular member or plate 68 is also provided with a plurality of apertures adjacent the outer marginal edge thereof and a plurality of elongate pins 73 project through these apertures, each being threaded as at 74 intermediate the ends thereof, and each pin being journalled in recesses in the lower wall 39b and the divider wall 42 of the associated housing 39. The apertures in the plate or annular member 68 are also threaded and threadingly engage the threaded portion 74 of the pins 73.

Each pin 73 also has a sprocket 75 keyed thereto for rotation therewith and an endless chain 76 is trained around the sprockets, as best seen in FIGS. 4 and 5. One of the pins 73 has an upwardly extending portion 73a which projects upwardly through the upper compartment 41 and exteriorly thereof, and is provided with a turning handle 77 which is secured thereto to facilitate rotation thereof. Thus, by rotating the handle 77, the sprockets 75 acting through the chain 76 will be rotated simultaneously and will rotate the pin 73. This produces vertical translation of the annular member 68 which in turn causes vertical shifting movement simultaneously of all the various segments 64. Thus, the barrier assembly may be vertically adjusted with respect to the opening 39a of the associated housing 39.

A shroud structure 78 of generally annular configuration is mounted on the housing 39 adjacent its outer marginal edges and this shroud has a downturned annular skirt or flange 79 which is provided with a plurality of openings 80 therein that extend upwardly from the lower edge of the skirt 79 and terminate adjacent the upper portion of the skirt. It will be noted that these openings 80 are circumferentially spaced apart and each is positioned adjacent one of the discharge orifices of one of the jet mechanisms 44 to permit the high velocity jet of water to pass outwardly through the opening 80. This shroud structure 79 therefore tends to prevent water discharged from the jets 46 from being deflected backwardly into the various components of the associated separating device and barrier assembly.

Means are also provided for permitting yielding movement of the barrier segments and this means comprises a plurality of double acting pneumatic cylinders 81, each mounted on the annular plate or member 68, and each having a piston movable therein to which is connected one end of a piston rod 82 as best seen in FIG. 4. The outer end of a piston rod 82 for each cylinder 81 is pivotally connected by pivot 83 to an arm or axle 66 for movement therewith. Thus, swinging movement of any of the barrier segments 64 will be transmitted to the associated arm 84 through the pin 66 to the piston rod 82. This pivoting movement is yieldably resisted by the air pressure in the cylinder 81, but does permit some yielding movement. The interior of the cylinder 81 will be connected to a source of air under pressure by main supply conduits 85 and 86, each of which is connected in communicating relation to one end of an arcuate manifold ring 87. Suitable interconnecting conduits 88 interconnect adjacent cylinders 81 together in communicating relation while branch conduits 89 interconnect each cylinder 81 in communicating relation with the manifold ring 87.

It is pointed out that although the barrier assembly is movable relative to the jet mechanism 44 when the barrier segments yield to permit the passage of a bone therethrough. It has been found desirable in some instances to mount the jet mechanisms 44 directly on the barrier segments so that the jet mechanisms are movable therewith. Although not shown in the drawing, no more than one jet mechanism would be mounted on each segment.

Referring again to FIG. 1, it will be seen that a generally circular housing 90 is provided for the overall power unit for the apparatus and this housing 90 is mounted upon the floor 18, substantially centrally of the apparatus 10. The housing contains an electric motor (not shown) which is operatively connected to a gear box 91 which in turn propels a Geneva drive device 92. A revolvable generally cylindrical pedestal 93 has a generally circular support plate 94 mounted thereon. The support plate 94 serves to revolvably mount a revolving manifold block 95 which has a plurality of passages therein through which the hydraulic fluid passes to various supply conduits for the various components of the system.

It will also be seen that one end of an elongate vertically disposed double acting hydraulic cylinder 96 is mounted on the manifold block 95 and projects upwardly therefrom. The cylinder 96 has an axially movable piston therein to which is connected a piston rod 97 that projects exteriorly of the cylinder 96 and is extensible and retractable relative thereto.

The upper end of the piston rod 97 has a pin 98 projecting axially therefrom and this pin projects through a hub or sleeve 99 of a carriage 100. The upper end of the pin 98 is threaded and is engaged by jam nut 101 to secure the carriage to the piston rod 97.

It will be noted that the carriage 100 is of hexagonal configuration and is comprised of an upper plate 102 and a lower plate 103 which are rigidly interconnected to each other by a continuous hexagonal side wall 104. The hexagonally shaped carriage 100 is provided with three vertically disposed elongate guide sleeves 105 which depend therefrom, and each of which is disposed in embracing relation around one of the guide rods 21. Suitable bushings or bearings 106 are interposed between each guide sleeve 105 and its associated guide rod 21 to facilitate vertical translation of the carriage with respect to the guide rods 21. It will also be noted that each guide sleeve 105 is provided with an annular seal 107 at the lower end thereof which engages the exterior surface of the associated guide rod in sealing relation therewith.

It will be seen that the carriage 100 has a plurality of elongate outwardly projecting generally tubular arms 108 rigidly secured thereto for vertical movement therewith. These tubular arms 108 are preferably constructed of suitable rigid material, such as steel or the like, and each has a substantially flat flanged inner end 109 which is secured by suitable bolts 110 or the like to one of the flat side wall portions 104 of the carriage 100. It will therefore be seen that six such arms 108 are provided and each has its outer end positioned above one of the deboning unit upper cabinets 25.

The outer end of each arm 108 is also provided with a flanged end 111 which is secured by bolts 112 to a generally rectangular shaped housing 113, as best seen in FIG. 7. A rotary hydraulic motor 114 is rigidly mounted by suitable bolt means 115 or the like upon the housing and this motor 114 has a revolvable output shaft 116 which projects interiorly of the housing 113. The output shaft 116 is keyed to a sleeve 117 so that the latter is revolvable with the shaft 116 and the sleeve is secured to the upper end of an elongate spindle or shaft 118 by universal joint 119. The housing 113 has an aperture 120 in the lower end thereof and the spindle 118 projects downwardly through the aperture and through the opening in the upper end wall of the associated upper cabinet 25.

An elongate hollow exterior sleeve 121 has its upper end positioned within the associated housing 113 and is fixedly secured thereto, and this outer sleeve 121 projects downwardly through the opening 120 and houses the spindle or shaft 118 therein, as best seen in FIG. 7.

An elongate inner bearing sleeve 122 is disposed concentrically around the spindle 118 and interiorly of the outer sleeve 121. This inner sleeve 122 is preferably formed of a suitable metallic material. The outer sleeve 121 is provided with a pair of inwardly projecting collars 123 adjacent opposite end portions thereof which extend radially inwardly therefrom and engage the inner surface of the outer sleeve 121. Suitable spacer sleeves 124 engage the collars 123 and prevent axial movement of collars 123. An elongate intermediate sleeve 125 is disposed concentrically around the inner bearing sleeve 122 and interiorly of the exterior sleeve 121, and this intermediate sleeve is formed of a resilient yieldable material such as rubber or the like. It will be noted that opposite ends of the resilient yieldable intermediate sleeve 125 is engaged by the collar 123.

The lower end of the spindle 118 is interconnected to a relatively short shaft section 126 by means of a universal joint 127, and it will be noted that this short shaft section 126 projects exteriorly of the exterior sleeve 121.

The short shaft section 126 is journalled in a self-lining or spherical bearing 128 which is positioned adjacent the lower end of the outer sleeve 121 and interiorly thereof. The shaft section 126 has a hollow recess therein which opens downwardly and is rigidly secured to a generally cylindrical sleeve element 129, which is revolvable with the shaft section 126. The sleeve element 12a has a female socket element 131 secured thereto for rotation therewith. The female socket element 131 terminates in a generally hexagonally shaped socket 134.

The bone pinning mechanism 130 includes a male socket engaging element 130a which is insertable in the female socket element 131 to be releasably locked therein. A body portion 130b which is of generally cylindrical configuration is integrally formed with the male socket element 130a and is provided with a pair of annular grooves 132. A pair of pins 133 are secured to the body portion 130b and projects axially therefrom. A hexagonal socket 134 receives the terminal portion of male socket engaging element 130a therein, the latter also being of mating hexagonal shape. It will therefore be seen that when the hydraulic motor 114 is driven, the shaft 116 will be revolved along with the spindle 118, which revolves the short shaft section 126 and the socket element 131. When the bone pinning mechanism with a chunk of meat secured thereto is engaged by the socket element 131, the chunk of meat to be deboned will also be revolved.

It will also be seen that when the piston rod 97 is extended from its retracted position as illustrated in FIG. 1, all of the arms 108 will be simultaneously elevated, which elevates the spindle assemblies and the chunks of meat carried by the lower ends thereof. It is pointed out that when the piston rod 97 is in its lowered position, the socket element 131 and short shaft section 126 will be positioned in the associated lower cabinet 24, and below the separating device and barrier assembly. If the bone pinning mechanism with a chunk of meat attached thereto is applied to the socket element 131, the chunk of meat will also be positioned in the associated lower cabinet. The pins 133 of the bone pinning mechanism will be embedded in the bones of the chunk of meat to be deboned to immobilize the articulated joint thereof. The end of the bone will project into the opening of the barrier assembly and will be moved therethrough while the chunk of meat will remain on the distal or lower side of the barrier assembly.

An intermediate annular flat support plate 137 is provided, and this intermediate support plate is spaced above the lower support plate 94. A plurality of tubular support members 138 have their lower ends mounted on the lower support plate 94 and project upwardly therefrom. These tubular support members project through the intermediate support plate 137 and are clamped thereto by suitable clamping collars 139.

It will also be seen that the tubular support members 138 also project upwardly and are attached to an upper support plate 140 which is also of flat annular configuration. The intermediate support plate as well as the upper support plate are both provided with central openings therein through which the cylinder 96 projects. It will be noted that the guide rods 21 are secured at their lower ends to an independent support ring 137a and project upwardly through the central opening in the intermediate support plate 137 and upper support plate 140, and are secured to support assembly 19. To this end, it will be noted that the respective central openings in the intermediate support plate 137 and the upper support plate 140 is of sufficient size to permit the passage of the guide sleeves 105 therethrough.

Means are provided for simultaneously engaging and transferring a plurality of chunks of meat from an infeed conveyor means (not shown) to the lower ends of the respective spindle assemblies for coupling to the socket members thereof. This means comprises a plurality of elongate revolvable shafts 141 each of which extends between the intermediate support plate 137 and the lower support plate 94. Rotary hydraulic motors 142 mounted against the lower surface of the lower support plate 94 revolve the shafts 141 and the upper end of these shafts 141 are journalled in a bearing carried by the intermediate support plate 137.

Figure 8:
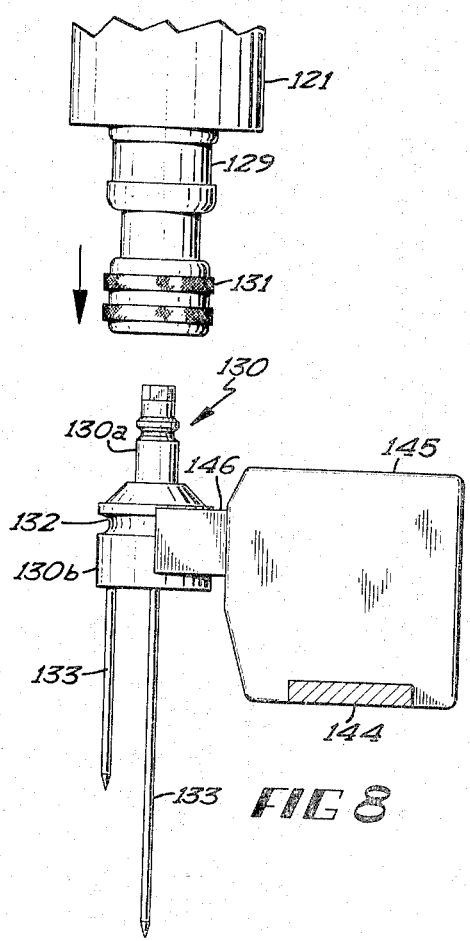
FIG. 8 is an elevational view of a magnetic transfer arm and bone pinning device just prior to coupling of the latter with the spindle assembly.

Referring now to FIG. 8, each shaft 141 has a sleeve type hub 143 of an elongate infeed transfer arm 144 keyed thereto for revolving movement therewith. It will be noted that each arm extends radially outwardly from opposite sides of its associated hub or sleeve 143 and has an electromagnetic gripping mechanism 145 mounted on its outermost end. The electromagnetic gripping device 145 is provided with a pair of electromagnetic elements 146 which project outwardly therefrom and which are adapted to fit within a groove 132 of the bone pinning mechanism 130. The bone pinning mechanism 130 is formed of a ferrous material and when the electromagnetic gripping mechanism 145 is energized, and the magnetic elements 146 engage the annular groove, the bone pinning mechanism and the ham carried thereby will be supported by the arm 144. Thereafter, when the arm is revolved or swung by rotation of the shaft 141, the chunk of meat to be deboned will also be swung therewith.

Although not shown in the drawing, it is pointed out that the electromagnetic gripping mechanism 145 will be of conventional construction and electrical current will be supplied thereto through suitable electrical conductors. It is pointed out that the apparatus will include an infeed transfer device (not shown) for each deboning unit and in the embodiment shown, six such transfer arms will be provided each being driven by an associated shaft and a hydraulic rotary motor. These shafts will be arranged in circular fashion between the lower and intermediate plates and the arms 144 will be swingable from a pick-up position located exteriorly of one of the lower cabinets to a discharge position wherein that end of the arm which supports the electromagnetic gripping mechanism will be positioned interiorly of the lower cabinet and in a position to insert the male socket engaging element 130a into the female socket element 131 at the lower end of the associated spindle assembly. Means are therefore provided for properly positioning each bone pinning mechanism 130 so that the male socket engaging element 130a thereof is in axial alignment with the socket of the adjacent spindle assembly. To this end it will be seen that each electromagnetic gripping mechanism has a pair of spaced apart magnetic gripping elements 146 which projects exteriorly of the housing. These magnetic gripping elemnts are adapted to engage mating groove 132 of the bone pinning mechanism 130 at the lower end of the spindle assembly upon inward swinging movement of the transfer arm 144 so that the male socket-engaging element 130a of the bone pinning mechanism 130 will be axially aligned with the female socket element 131. Thereafter, upon downward movement of the spindle assembly, the male socket engaging element 130a will be received within the female socket element 131 and be gripped with snap coupling action therein. Thus, when the electromagnetic elements 146 are de-energized, each arm 144 may be retracted and the bone pinning mechanism will be released by the electromagnetic gripping mechanism 145 and will be supported by the associated spindle assembly.

Means are provided for automatically de-energizing the electromagnetic gripping mechanism 145 and this means includes a normally closed switch mechanism 148, which is provided with a control button or element 149 which projects exteriorly therefrom as best seen in FIG. 1. It will be seen that the control button 149 is positioned in obstructing relation with respect to the shorter end of the transfer arm 144 whereby when the transfer arm 144 is swung completely inwardly to its discharge position, the arm will engage and depress the control button 149 thus de-energizing the electromagnetic gripping mechanism and the electromagnetic gripping elements 146.

Means are also provided for removing the bone pinning mechanism with only the bone attached thereto after the deboning operation, and this means also includes a plurality of revolvable shafts 150, each of which extends between the intermediate plate 137 and the upper support plate 140. These shafts are journalled at their lower end at the intermediate support plate 137 but each has its upper end drivably connected to one of a plurality of rotary hydraulic motors 151 which are mounted upon the upper support plate 140 as best seen in FIG. 1. It will be noted that each of the shafts 150 are disposed in axial alignment with one of the shafts 141, but each shaft 141 is driven independently of the aligned shaft 150, there being no driving connection between any two of the aligned shafts. A hub or sleeve 152 of a transfer arm 153 is keyed to each shaft for rotation therewith. Referring now to FIG. 8 it will be noted that each transfer arm 153 also has an electromagnetic gripping mechanism 154 secured to the outer end thereof which has suitable electromagnetic gripping elements 155 and a disengaging member 156.

Figure 11:
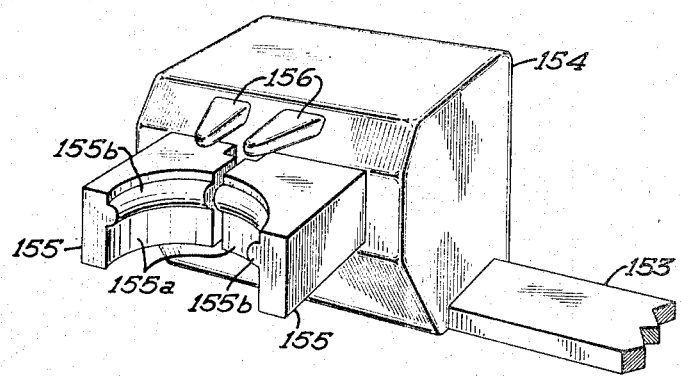
FIG. 11 is a fragmentary perspective view of one of the upper magnetic gripping mechanisms illustrating detailed construction of the magnetic gripping elements.

Referring now to FIG. 11, it will be seen that each electromagnetic gripping element 155 has an arcuate face 155a having projecting arcuate lip 155b which engages in the arcuate groove 132 of the bone pinning mechanism 130. The electromagnetic gripping elements 146 are identical in construction to the magnetic gripping elements 155. The removal transfer arms 153 are adapted to swing into the upper cabinets 25 of each deboning unit, wherein the energized electromagnetic gripping elements 155 of the associated electromagnetic gripping device will grip the fitting of the bone pinning mechanism and will retain the same thereon. The disengaging member 156 of each upper arm is comprised of a pair of outwardly projecting fingers which engages the sleeve 131 urging the same upwardly whereby upon upward movement of the spindle assembly the bone pinning mechanism will be disengaged therefrom. Thereafter upon outward swinging movement of the removal transfer arms 153, the bone pinning mechanisms with the bone attached thereto may be swung outwardly from the upper cabinet and upon de-energization of the electromagnetic gripping mechanism 154 will release the bone pinning mechanism along with the bone attached thereto.

Means are also provided for de-energizing the electromagnetic gripping mechanisms 154 and comprise a plurality of normally closed switch devices 157 each of which is mounted on the upper support plate 140 as best seen in FIG. 1. Each switch mechanism 157 is provided with a control button or element 158 that projects exteriorly therefrom. It will be seen that a control button 158 is positioned in obstructing relation with respect to the shorter end of the transfer arm 153, whereby when the arm is swung completely outwardly to its removal position, the arm will engage and depress the control button 158 and will therefore de-energize the electromagnetic gripping mechanism and the electromagnetic gripping elements 155 to release the bone-pinning mechanism. Suitable removal means (not shown) such as a conveyor will be positioned to receive and remove the bone pinning mechanisms and bones attached thereto.

Means are also provided for centering the bone pinning mechanism during removal thereof, since the spindle assembly will tend to be misaligned axially during the removal operation. Each deboning unit is provided with a centering unit, and each of these units, as best seen in FIG. 1, comprises a pair of pneumatic cylinders 159 each being mounted on the fixed cabinet section 25a of each upper cabinet 25 and each having a piston axially movable therein to which is connected a piston rod. The piston rod of each of these pneumatic cylinders has an elongate centering element 160 affixed thereto and projecting inwardly of the cabinet. The outer ends of the positioning elements 160 flare outwardly and are bifurcated to define a pair of outwardly projecting fingers 161 which diverge from each other to define a concave angular engaging surface 162, which presents an obtuse angle thereat. Each pneumatic cylinder 159 is connected by suitable conduit 163 to a source of air under pressure whereby when the piston rods are extended, the fingers and concave gripping surface will engage the outer sleeve of the associated spindle assembly, and will center the same when stopped for removal of the bone pinning mechanism.

Referring again to FIG. 1, it will be seen that each fixed section of each lower cabinet has an inclined plate 164 secured thereto and projecting downwardly and outwardly therefrom. This inclined plate lies below the associated lower cabinet in obstructing relation therewith. An incline perforated guide structure 165 formed of a plurality of spaced apart elongate rods is provided for each lower cabinet and is spaced above the associated inclined plate 164. This perforated guide 165 is also disposed in obstructing relation with respect to the lower end of each lower cabinet so that when a chunk of meat is released after the deboning operation, the deboned chunk will fall upon the perforated guide and will be directed downwardly and outwardly therefrom.

Such chunks of meat are received upon an annular revolvable conveyor table 166 which will convey the deboned chunks of meat to a discharge station (not shown) wherein the chunks of meat will be diverted therefrom. The means for moving the conveyor table 166 are not shown, but any conventional suitable power shifting means may be provided for performing this function.

A drain trough structure 167 is attached to the plates 164 by inclined side flange, the latter forming a continuation of the plate 164 and this drain trough is of annular construction and receives water from all of the deboning units for collecting the same and controlling discharge thereof.

A plurality of shield units are provided, each including a generally angularly shaped shield structure 169 positioned oppositely of one of the downwardly inclined perforate guides 165 and above the annular conveyor table 166. Each of the shield structure 169 is connected by means of a bracket 170 to a support post 171, each bracket having a slotted plate 172 affixed to the lower end thereof engages a pair of pins 173 on the post 171. Each plate 172 has a vertical slot 174 therein and an angular slot 175 therein communicating with the slot 174. With this arrangement, the shield structure may be lifted vertically and swung outwardly and downwardly to permit access to the structure located below each lower cabinet for cleaning and the like.

During operation of the deboning apparatus, the chunks of meat to be deboned, which may be picnic hams or the like, will be supplied to the apparatus by any suitable conveyor means. The doors of the lower cabinets will all be opened and the infeed transfer arms will be simultaneously swung from their outer position to a position interiorly of the lower cabinet. The fitting of the bone pinning mechanism will be engaged and supported by the electromagnetic mechanisms mounted on each arm. All of the chunks of meat will be positioned interiorly of the lower cabinets and downward movement of the spindle assemblies will result in coupling of the bone pinning mechanisms to the socket of the respective spindle assemblies. The infeed transfer arms will then all be swung outwardly of the lower cabinets and the lower cabinet movable sections or doors will be closed.

Thereafter, the piston rod 97 will be extended simultaneously shifting all the spindle assemblies upwardly and all of the rotary hydraulic motors will be driven to rotate the spindles of each spindle assembly. That end portion of each embedded bone which is adjacent the bone pinning mechanism will be pulled through the opening 72 in the associated barrier assembly 63, and the peripheral surfaces of the bone will be engaged by the arcuate edge surfaces 71 of the barrier segments that define the opening 72. This opening 72 is preferably of a size to accommodate the smaller size bones and in the event of larger size bones, these barrier segments may yield outwardly against the yieldable resilient action of the air cushions defined by the pneumatic piston and cylinder units associated therewith. The yieldable mounting means for the barrier segments also permit uneven yielding movement of the barrier segments during rotation of the bone.

As the chunks of meat with the bone embedded therein are moved upwardly, the periphery of the embedded bone will be subjected to the high velocity jets of water discharged by the jet mechanisms 44 and 56. The jet mechanisms are all positioned on the proximal side of the barrier assembly, and as the spindle is revolved and moved upwardly, the jet streams of water will strike the bone, and this will cause the meat to be cut away from adherence to the surface of the bone. The chunk of meat, however, will be held against the distal or lower surface of the barrier assembly and the meat will be progressively separated in sleeve fashion from the bone. Thus, the barrier assembly not only serves to retain the meat against the distal surface thereof, but also shields the meat from the high velocity penetrating action of the water. By this shielding action, the meat will not become permeated with water, nor will the meat become shredded from the blasting action of the jet mechanisms. The deboned chunk of meat will be held against the distal surface of the barrier assembly until the bone is removed therefrom and the chunk of meat will then fall against the associated perforate guide 165 and will be discharged upon the annular conveyor table 166. Any water which passes downwardly through the lower cabinet will pass through the perforate guide 165 and will be guided into the trough structure by the associated inclined plate 164. The chunks of meat will be supported on the annular conveyor table 166 until they are diverted therefrom by discharge suitable means (not shown).

The bone which has been removed from the chunk of meat will still be supported from the lower end of the associated spindle assembly by the bone pinning mechanism, and this bone with the fitting mechanism secured thereto will be disposed in the upward cabinet of the deboning unit. Thereafter, the upward spindle motion is stopped, the door or movable section of the upper cabinet will be opened and the removal transfer arm 153 will swing inwardly of the cabinet and centering unit aligns the bone pinning mechanism with axis of the spindle. Since these electromagnetic elements are in the energizing condition, these magnetic elements will grip the fitting. The coupling disengaging elements 156 of each electromagnetic mechanism will engage the fitting whereby upon further upward movement of the spindle assembly, the bone fitting mechanism will be disengaged from the female socket member at the lower end of each spindle assembly, and upon outward swinging movement of the removal transfer arms, the bone and fitting secured thereto will be removed therefrom. When the electromagnetic mechanisms 154 are de-energized by the associated switch mechanism 157, the fitting will be released upon a suitable conveyor (not shown) which will remove the bones and fittings attached thereto to a collection point. The bone pinning mechanisms may then be removed from the bones by any suitable means so that these bone pinning mechanisms may be used in a subsequent deboning operation.

The piston rod 97 will then be retracted, thus lowering the spindle assemblies for the next deboning operation. As the spindle assemblies are lowered, the doors on the lower cabinets will be opened and the infeed transfer arms again will be positioned in the lower cabinet while supporting the bone pinning mechanisms with the chunks of meat attached thereto. Thus, as the spindle assemblies reach the lower end of their downward movement, the fittings of the bone pinning mechanisms will be coupled to the lower end of the spindle assemblies and de-energization of the electromagnetic elements will result in support of the chunks of meat solely by the spindle assemblies. Thus the cycle is completed and the next group of chunks of meat are in position for the subsequent deboning cycle. The Geneva drive and hydraulic rotary coupling are provided to minimize the extent of the infeed coupling are provided to minimize the extent of the infeed mechanism and take out mechanism which are not shown in the present apparatus.

From the foregoing description, it will be seen that ont only have we provided a unique process and apparatus which is capable of a high volume production in a deboning operation, but this process and apparatus functions in a more efficient manner than any heretofore known comparable operation.

It will, of course, be understood that various changes may be made in the form, details, arrangement and proportions of the various parts without departing from the scope of our invention.

What we claim is:

1. A process of deboning a chunk of meat comprising positioning a chunk of meat having a bone embedded therein against the distal surface of a barrier having a distal surface and a proximal surface, and having an opening therein through which an end of bone to be removed will project, the opening in the barrier being of a size to accommodate the exterior surface of the bone, producing relative movement between the barrier and the bone to be removed while simultaneously subjecting the entire periphery of the bone to the action of high velocity jets of flowable material located adjacent the proximal surface of the barrier to cause the meat to be progressively separated from the bone throughout the length of the latter while retaining the chunk of meat substantially intact against the distal surface of the barrier.

2. The process as defined in claim 1 wherein force is applied to the chunk of meat to progressively force the bone through the opening in said barrier.

3. A process as defined in claim 1 and additionally producing relative revolving movement between the jets of flowable material and the chunk of meat with the bone embedded therein.

4. A process of simultaneously deboning a plurality of chunks of meat in which each chunk of meat has a bone embedded therein, said process comprising simultaneously positioning each chunk of meat against the distal surface of one of a plurality of barriers, each barrier having a distal surface and a proximal surface, and having an opening therein through which one end of the bone to be removed will project, the opening in the barrier being of a size to engage the exterior surface of the bone of the associated chunk of meat, simultaneously producing relative movement between the barriers and the bones in the chunks of meat while simultaneously subjecting the peripheries of the bones to the action of high velocity jets of water, each jet of water being discharged against its associated bone adjacent the proximal surface of the barrier to thereby cause the chunks of meat to be progressively separated from their associated bones throughout the links of the latter while retaining the chunks of meat substantially intact against the distal surfaces of the barriers.

5. A process as defined in claim 4 wherein force is applied simultaneously to the bones embedded in chunks of meat to progressively force the bones through the openings in the barriers.

6. A process as defined in claim 4 wherein chunks of meat are simultaneously revolved as they are urged against the barriers.

7. A process for separating a core member of an article from embedded relation within a second material of the article, the core member having a substantially different hardness than the second material, said process comprising the steps of, positioning the article in proximal relation with respect to one surface of a barrier having an opening therein through which an end portion of the core member will project, the opening in the barrier being of a size to permit the core member to pass therethrough, producing relative movement between the barrier and article to cause the core member to be moved through the opening in the barrier while simultaneously subjecting the periphery of the core member to the action of high velocity jets of flowable material located adjacent the opening in the barrier to cause progressive separation of the core member and second material from each other, while maintaining the core member and second material respectively in substantially intact condition, and retaining the second material adjacent said one surface of the barrier.

8. The process as defined in claim 7 wherein the core member is of varying cross-sectional size throughout its length and is substantially harder than said second material.

9. The process as defined in claim 7 wherein said flowable material is water.

References Cited

UNITED STATES PATENTS

| | | | |
|---|---|---|---|
| 2,851,362 | 9/1958 | Goldberg | 17—1 X |
| 2,893,051 | 7/1959 | Massengill | 17—1 |
| 3,089,775 | 5/1963 | Lindall | 17—1 X |

FOREIGN PATENTS

| | | |
|---|---|---|
| 1,248,823 | 10/1960 | France. |
| 561,246 | 10/1932 | Germany. |

LUCIE H. LAUDENSLAGER, *Primary Examiner.*